(12) United States Patent
Kaplanis et al.

(10) Patent No.: US 12,340,778 B2
(45) Date of Patent: Jun. 24, 2025

(54) DISPLAY OF SELECTED IMAGE REGIONS

(71) Applicant: HEWLETT-PACKARD DEVELOPMENT COMPANY, L.P., Spring, TX (US)

(72) Inventors: Anthony Kaplanis, Spring, TX (US); Alexander Morgan Williams, Spring, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/866,836

(22) Filed: Jul. 18, 2022

(65) Prior Publication Data

US 2024/0021175 A1 Jan. 18, 2024

(51) Int. Cl.
*G06F 3/14* (2006.01)
*G09G 5/14* (2006.01)

(52) U.S. Cl.
CPC .......... *G09G 5/14* (2013.01); *G09G 2340/045* (2013.01); *G09G 2354/00* (2013.01); *G09G 2360/04* (2013.01)

(58) Field of Classification Search
CPC ..................... G09G 2340/045; G09G 2360/04
USPC ................................................. 345/533
See application file for complete search history.

(56) References Cited

U.S. PATENT DOCUMENTS

| 10,579,201 | B2* | 3/2020 | Lee ..................... G06F 3/04842 |
| 2016/0225189 | A1* | 8/2016 | Nishizawa .............. G06F 1/163 |
| 2022/0244794 | A1* | 8/2022 | Kaplanis ............. G06F 13/4282 |
| 2022/0335911 | A1* | 10/2022 | Zhao ..................... G09G 5/391 |

FOREIGN PATENT DOCUMENTS

WO WO-2021061163 A1 * 4/2021 ......... G06F 13/4282

* cited by examiner

*Primary Examiner* — Samantha (Yuehan) Wang
(74) *Attorney, Agent, or Firm* — Quarles & Brady LLP

(57) ABSTRACT

In one example in accordance with the present disclosure, a display device is described. The example display device includes a processor and a memory communicatively coupled to the processor and storing executable instructions that when executed cause the processor to: (1) receive, from a graphics processor of a source device, a screen image for display on the display device; (2) define an image region of the screen image for duplication on a second display device; and (3) send the image region to the second display device.

17 Claims, 6 Drawing Sheets

DISPLAY OF SELECTED IMAGE REGIONS

BACKGROUND

Electronic technology has advanced to become virtually ubiquitous in society and has been used to enhance many activities in society. For example, electronic devices are used to perform a variety of tasks, including work activities, communication, research, and entertainment. Different varieties of electronic circuits may be utilized to provide different varieties of electronic technology. In some cases, electronic devices may be used to display image data.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
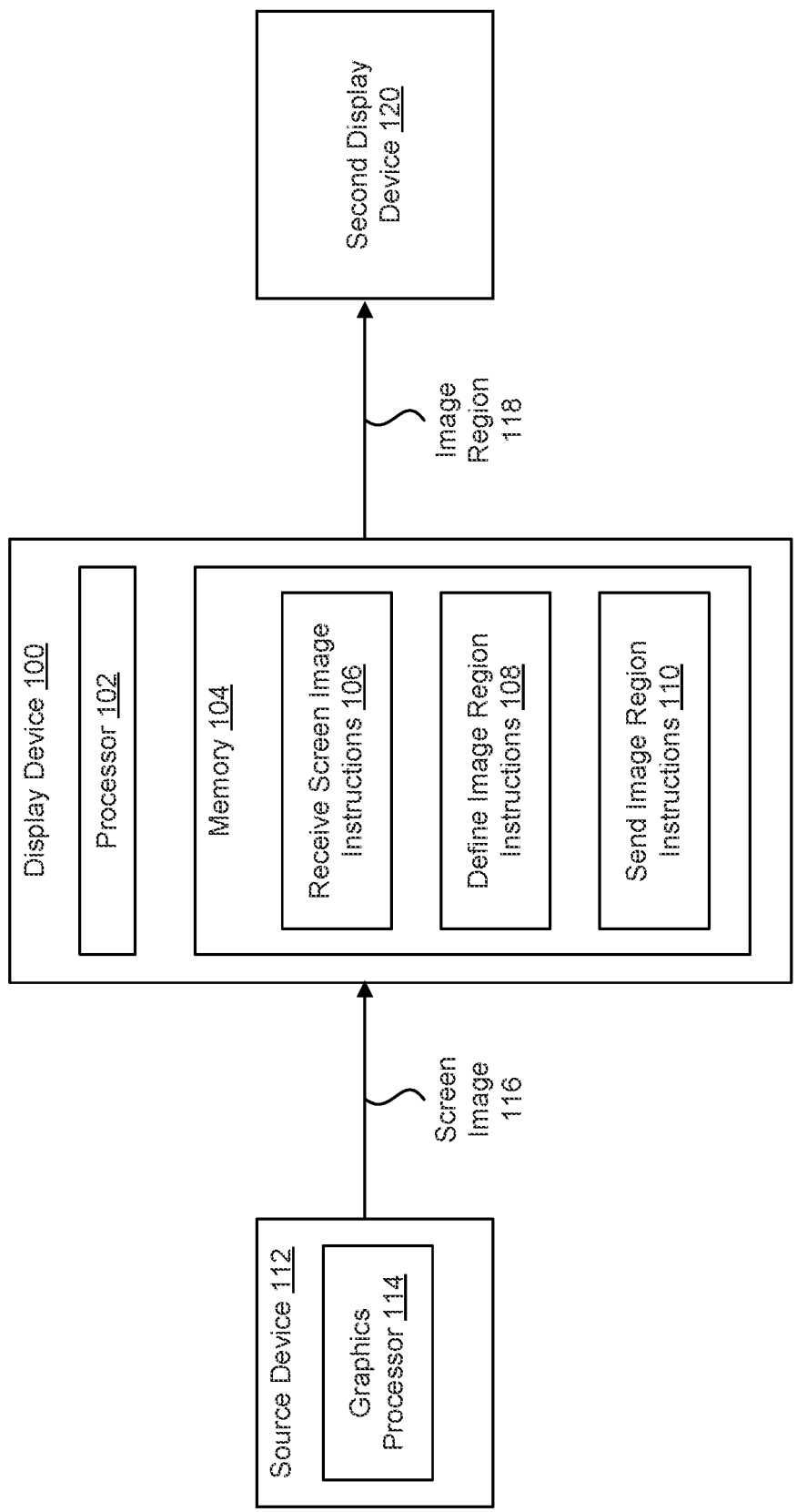
FIG. 1 is a block diagram of a display device to display an image region, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In some examples, electronic devices may process image data for display by a display device. For example, a display device may produce a visual representation of an image or text by operating light-emissive circuitry represented as a number of pixels based on processed image data. A display device may provide a certain range of colors producible by the number of pixels. A display device may present (e.g., display) an image on a panel using color data (e.g., such as red, green, and blue (RGB) channel data) to determine a color to display for every pixel on the panel. Colors displayed by a panel may be dependent on the color characteristics of the display panel. Examples of display devices include external monitors (e.g., flat panel monitors, curved panel monitors, etc.), integrated monitors (e.g., laptop computer displays, tablet computer displays, etc.), and extended-reality displays (e.g., virtual-reality headsets, augmented reality headsets, etc.).

A display device may receive a screen image. For example, a source device (e.g., a computing device) may generate a screen image for display by the display device. The display device may receive image data for the screen image. The display device may render the screen image for viewing by a user.

In some examples, a user may want to view a sub-region of the screen image on a separate display device. This sub-region of the screen image is referred to herein as an image region.

In some examples, a user may want to display the image region on a second display to view a magnified view of the image region. For instance, the image region on the screen image may be small, which may be difficult for the user to view. In some examples, the image region may include text or other graphical information. As the user views the image region on the screen image, the user may have a difficult time interpreting the text or graphical information.

In a specific example, in some games there are regions of the screen image that display useful information such as a mini map or quest details. These game elements may be small and located in a corner of the screen image in a static location. There are also times where information will be displayed in a specific region for a period of time before moving on in the game. In this example, a user may want to enlarge selected game elements and/or capture a static view of the selected game element.

In the examples described herein, an image region displayed on a first display device may be sent to a second display device (or multiple secondary display devices). In the described examples, the first display device may generate (or forward) image data for the selected image region for display by the second display device. It should be noted that in the described examples, the first display device may generate the image data for the selected image region without involvement of a graphics processor of a source device. In other words, the first display device may send the image region to the second display device without the graphics processor separately generating image data for the second display device.

In some examples, the present specification describes display device. The example display device includes a processor and a memory communicatively coupled to the processor and storing executable instructions that when executed cause the processor to: (1) receive, from a graphics processor of a source device, a screen image for display on the display device; (2) define an image region of the screen image for duplication on a second display device; and (3) send the image region to the second display device.

In another example, the present specification also a method by a display device. The example method includes: (1) receiving, from a source device, a screen image for display on the display device; (2) receiving a user selection of an image region of the screen image for duplication on a second display device; (3) generating image data for the image region; and (4) sending the image data to the second display device to duplicate the image region.

In yet another example, the present specification also describes a non-transitory machine-readable storage medium comprising instructions executable by a processor to: (1) receive, from a source device, a screen image of a program executed by the source device, the program comprising a defined image region within the screen image; (2) receive a user selection of the defined image region for duplication on a second display device; and (3) send the defined image region to the second display device for magnification on the second display device.

As used in the present specification and in the appended claims, the term, "processor" may be a controller, an application-specific integrated circuit (ASIC), a semiconductor-based microprocessor, a central processing unit (CPU), a graphics processing unit (GPU), and a field-programmable gate array (FPGA), and/or other hardware device.

The memory may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement the functionality described herein.

Turning now to the figures, FIG. 1 is a block diagram of a display device 100 to display an image region 118, according to an example. As described above, examples of display devices include external monitors, integrated monitors, extended-reality displays, and other devices that render image data for view by an observer.

The display device 100 includes a processor 102. The processor 102 of the display device 100 may be implemented as dedicated hardware circuitry. In some examples, the dedicated hardware circuitry may be implemented as a controller, an application-specific integrated circuit (ASIC), a semiconductor-based microprocessor, a central processing unit (CPU), and a field-programmable gate array (FPGA), and/or other hardware device.

In some examples, a memory 104 may be implemented in the display device 100. The memory 104 may be dedicated hardware circuitry to host instructions for the processor 102 to execute. The memory 104 may take many types of memory including volatile and non-volatile memory. For example, the memory 104 may include Random Access Memory (RAM), Read Only Memory (ROM), optical memory disks, and magnetic disks, among others.

The display device 100 may also include instructions. The instructions may be implemented in a platform specific language that the processor 102 may decode and execute. The instructions may be stored in the memory 104 during execution. In some examples, the instructions may include receive screen image instructions 106, define image region instructions 108, and send image region instructions 110, according to the examples described herein.

The processor 102 may execute the receive screen image instructions 106 to cause the processor 102 to receive, from a graphics processor of a source device 112, a screen image 116 for display on the display device 100. There are scenarios when the display device 100 receives a data stream that includes image data. The data stream may include a flow of image data for display by the display device 100. In some examples, the screen image 116 may include a single image frame or a sequence of image frames intended for display on a display screen of the display device 100.

The display device 100 may receive the screen image 116 from a graphics processor 114 of the source device 112. In some examples, the graphics processor 114 is a GPU (also referred to as a graphics chip) of the source device 112. In some examples, a CPU or other processor may generate the screen image 116. In some examples, the display device 100 may be an external monitor that is connected to the source device 112.

In some examples, the screen image 116 may be received on a communication link that communicates the screen image 116 from the source device 112. The communication link includes an electronic pathway to communicate a data stream to the display device 100. The communication link may include a wired connection or a wireless connection between the display device 100 and the source device 112.

In an example, the communication link may be implemented according to cable port specifications used to convey data to the display device 100. Some examples of cable port specifications include Display Data Channel Command Interface (DDCCI) communication via virtual control panel (VCP) on DisplayPort cables. Other examples of cable port specifications include High-Definition Multimedia Interface (HDMI) cables, and Universal Serial Bus (USB) cables (e.g., USB Type-A, USB Type-C, etc.). In some examples, serial communication could be used to communicate the screen image 116 to the display device 100. In yet other examples, wireless communication may be used communicate the screen image 116 to the display device 100. In an example of cloud streaming, the screen image 116 may be integrated into a data stream transmitted to the display device 100 by a source device 112 over a network (e.g., the Internet).

Upon receiving the screen image 116, the display device 100 may render the screen image 116 on a display screen for viewing by a user. Thus, the display device 100 may generate a viewable screen image 116 using the image data provided by the source device 112. In some examples, the display device 100 stores the screen image 116 in memory (e.g., a frame buffer).

In some examples, the display device 100 may be connected to the second display device 120. For example, the display device 100 may be connected to the second display device 120 with a daisy chain between the display device 100 and the second display device 120. As used herein, daisy-chaining display devices means connecting a series of display devices to each other using a communication link (e.g., a cord connection) from one display device to another display device in a series, rather than connecting each device directly to the source device 112. In this example, the display device 100 is connected to the source device 112 and the second display device 120 is connected to the display device 100. In some examples, a third display device may be connected in series to the second display device 120, and so forth. Examples of communication interfaces that may be used to daisy chain the display device 100 to the second display device 120 include DISPLAYPORT (e.g., DISPLAYPORT version 1.2) or THUNDERBOLT.

It should be noted that when the second display device 120 is connected to the display device 100 via a daisy-chain connection, the display device 100 passes image data to the second display device 120. Thus, the second display device 120 is not directly connected to the source device 112.

The processor 102 may execute the define image region instructions 108 to cause the processor 102 to define an image region 118 of the screen image 116 for duplication on the second display device 120. In some examples, the image region 118 is a subset of the screen image 116 displayed on the first display device 100. For instance, the image region 118 may include a portion of the screen image 116.

The image region 118 may include a grid of pixels of the screen image 116 displayed on the display device 100. For example, the image region 118 may be defined by an array of pixels within the screen image 116.

In some examples, the image region 118 is selected on the display device by a user. For example, a user may indicate which pixels of the screen image 116 are to be included in the image region 118. In some examples, the display device 100 may include a user interface to allow the user to select the image region 118 on the display device 100. In some examples, the user interface may be used to implement the on-screen display (OSD) menu of the display device 100. In some examples, the user interface may include a cursor control device to allow the user to select the image region 118. Examples of cursor control devices include joysticks, directional pads, roller balls, or other devices that, when manipulated by a user, indicate a location of a cursor on the screen of the display device 100. Using the cursor control device, the user may select the image region 118. In some examples, the user interface on the display device 100 also includes a selection device to confirm the selection of the image region 118. Examples of the selection device include buttons that the user presses to enter the selected image region 118. It should be noted that in this implementation, the hardware used to select the image region 118 is integrated into the display device 100.

In some examples, the source device 112 may pass the user selection of the image region 118 to the display device 100. For example, a user may use a mouse or other input device to select the image region 118 of the screen image 116 displayed by the display device 100. The source device 112 may send information to the display device 100 indicating the location of the image region 118 within the screen image 116.

The processor 102 may execute the send image region instructions 110 to cause the processor 102 to send the image region 118 to the second display device 120. In some examples, upon receiving the user selection of 118, the display device 100 may generating image data for the image region 118. For example, generating the image data may include retrieving pixels within the image region 118 from the frame buffer of the display device 100. The display device 100 may then send the image region 118 to the second display device 120 for display on the second display device 120.

In some examples, the display device 100 includes a scaler. Independent of the connected source device 112, the scaler in the display device 100 may be used to select the image region 118 and pass the selected image region 118 to duplicate onto the second display device 120 via a video connection between the display device 100 and the second display device 120.

In some examples, the second display device 120 may magnify the image region 118 upon receiving the image data for the image region 118 from the display device 100. In some examples, the second display device 120 may use defined sizes for displaying the image region 118. For example, the defined sizes for displaying the image region 118 may be 1920×1080 pixel resolution or 1280×720 pixel resolution. If the second display device 120 has 4K resolution, then the second display device 120 may display the image region 118 using 3840×2160 pixel resolution so that scaling of the image region 118 is easier to perform by the secondary display device 120. In some examples, any scaling of the captured image region 118 may be handled by the second display device 120 to match the panel resolution on the second display device 120. In this way, real time magnification of the image region 118 may be implemented on the second display device 120.

For instances of unique sizes of the image region 118 being captured that do not correspond with a defined resolution used by the second display device 120, a scaler of the second display device 120 may select the closest available size to magnify the image region 118. The second display device 120 may then fill in unused space surrounding the magnified image region 118 with a black space.

In some examples, a user may select the image region 118 as a static image or a dynamic image. As used herein, a static image is a digital image that remains unchanged over a period of time. A dynamic image is a series of images that change over a period of time. For example, a dynamic image may include a video stream or other changing image data of the image region 118.

In the case where the image region 118 includes a static image, the display device 100 may receive a static image selection for the image region 118. For example, the display device 100 may include a user interface to indicate that the selected image region 118 is to be a static image. In response to receiving the static image selection, the display device 100 may generate static image data for the image region 118 for display on the second display device 120. The display device 100 may send the static image data to the second display device 120. In this manner, a user may capture information that may be temporarily displayed. The second display device 120 may continue displaying the static image data for the image region 118 until a user elects to remove or replace the image region 118.

In the case where the image region 118 includes a dynamic image, the display device 100 may receive a dynamic image selection for the image region 118. For example, the display device 100 may include a user interface to indicate that the selected image region 118 is to be a dynamic image. In response to receiving the dynamic image selection, the display device 100 may generate dynamic image data for the image region 118 for display on the second display device 120. In some examples, the dynamic image data includes a video stream of the image region 118. The display device 100 may send the dynamic image data to the second display device 120. In this manner, a user may view changes within the image region 118. The second display device 120 may continue displaying the dynamic image data for the image region 118 until a user elects to remove the image region 118 or change the image region 118 to a static image.

In some examples, a user may select a plurality of image regions 118 for display on the second display device 120. In this case, the display device 100 may generate composite image data for the plurality of image regions 118. For example, the display device 100 may combine the image data for the plurality of image regions 118 into a single composite image. In this manner, the display device 100 may tile the plurality of image regions 118 to show multiple captures/feeds on the second display device 120. The display device 100 may send the composite image data to the second display device 120.

In some examples, a selectable image region 118 may be integrated into a program executed by the source device 112. In this approach, a user may select the image region 118 for display in the second display device 120 by integrating into a selectable image region the program generating the screen image 116. In some examples, an application programming interface (API) may allow a program to communicate a user selection of a define image region 118 to the display device 100. Examples of the program includes games, simulators, extended-reality environments, operating systems, etc.

A program may include a defined image region 118 within the screen image 116. The defined image region may include a user-selectable image region within the program executed by the source device 112. Thus, the display device 100 may receive a user selection of the defined image region 118 for duplication on a second display device 120. For example, when a user selects an image region 118 with the program, the API may indicate, to the display device 100, the location of the image region 118 within the screen image 116. The display device 100 may then send the defined image region 118 to the second display device 120 for magnification on the second display device 120.

In some examples, the program can split its communication to the graphics processor 114 with regard to the defined image region 118. In an example, the graphics processor 114 may push the user-selected image region 118 to the second display device 120. In another example, the graphics processor 114 may push the image region 118 to the display device 100 and allow the display device 100 to parse the image region 118. In this case, the display device 100 may ignore the image region 118 or may push the image region to the connected second display device 120.

It should be noted that while the examples discussed thus far include displaying an image region 118 on a second display device 120, in some examples, the display device 100 may send image regions 118 to a plurality of display devices. For example, the display device 100 may send a first image region 118 to the second display device 120 and another image region 118 to a third display device (not shown). In some examples, a user may select which display device is to display which image region 118.

The described examples may enhance a user's experience by magnifying a selected image region 118. In some examples, the image region 118 displayed on the second display device 120 may be saved via a screenshot, where a user may refer to the content of the image region 118 at a later time. Furthermore, the described examples allow users to magnify image regions 118 without using software on the source device 112.

Figure 2:
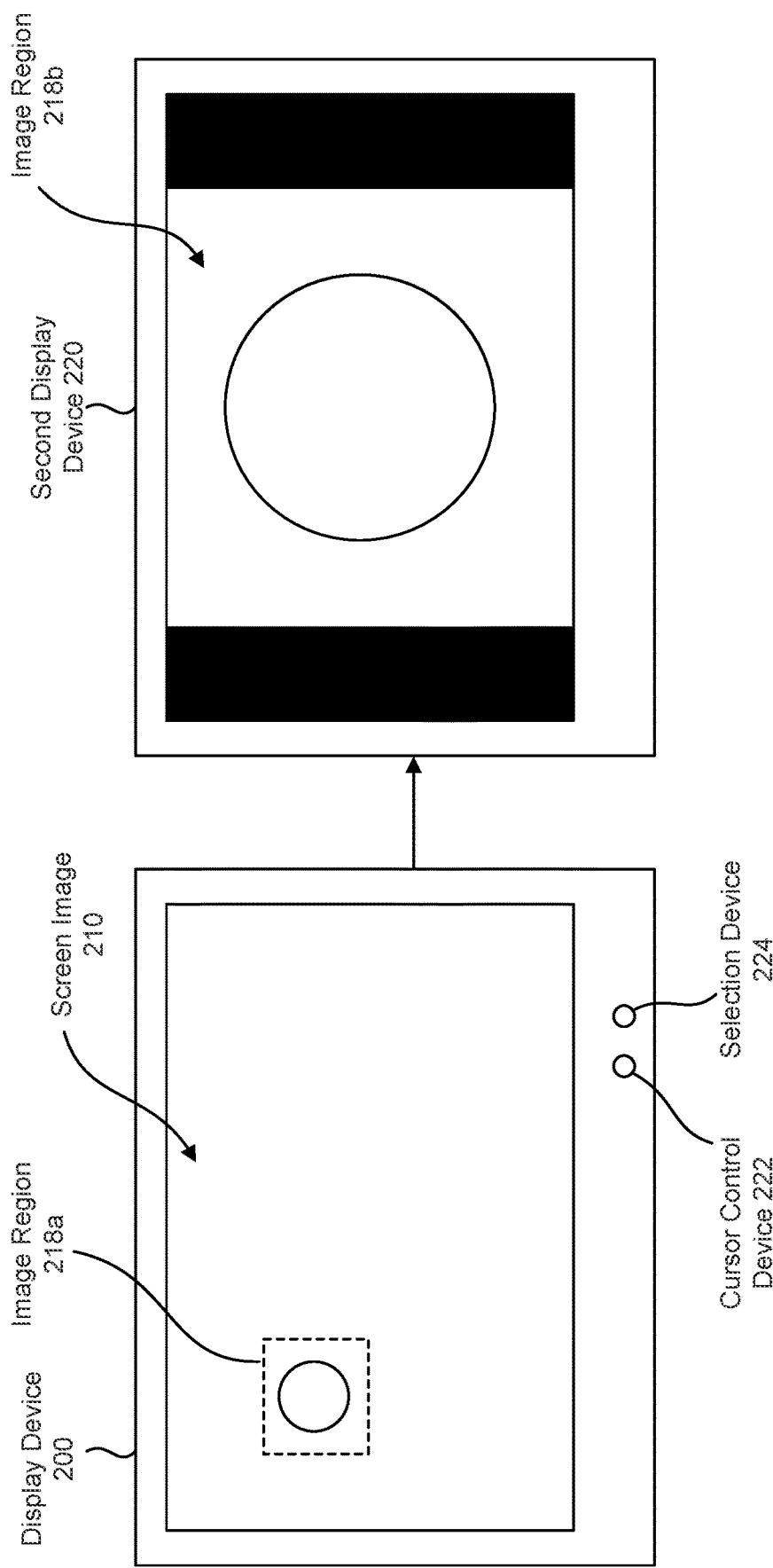
FIG. 2 illustrates the display of an image region, according to an example.

FIG. 2 illustrates the display of an image region, according to an example. In some examples, the display device 200 and the second display device 220 are implemented according to the display device 100 and second display device 120 of FIG. 1, respectively.

In the example of FIG. 2, the display device 200 receives a screen image 210 from a source device (e.g., FIG. 1, 112). The display device 200 may display the screen image 210. For example, the display device 200 may be implemented as a standalone external monitor that receives a data stream from the source device. The display device 200 may be connected to the second display device 220 via a daisy-chain connection.

In this example, a user selects an image region 218*a* using a user interface on the display device 200. For instance, the display device 200 includes a cursor control device 222 and a selection device 224. The user may draw the borders of the image region 218 using the cursor control device 222. The user may then confirm the image region selection using the selection device 224.

Upon receiving the image region selection, the display device 200 sends the image region 218*b* to the second display device 220. In some examples, the second display device 220 scales the image data of the image region 218*b* based on a defined resolution of the second display device 220. Thus, the second display device 220 automatically magnifies and displays the image region 218*b* without relying on the source device to send the image region 218*b*.

It should be noted that the second display device 220 adds black bars to the displayed image region 218*b* to fill in empty portions of the image region 218*b* after magnifying the image region 218*b*. In this manner, the second display device 220 may avoid distorting the image region 218*b* due to differences in the panel resolution of the second display device 220 and the size of the selected image region 218*a*.

Figure 3:
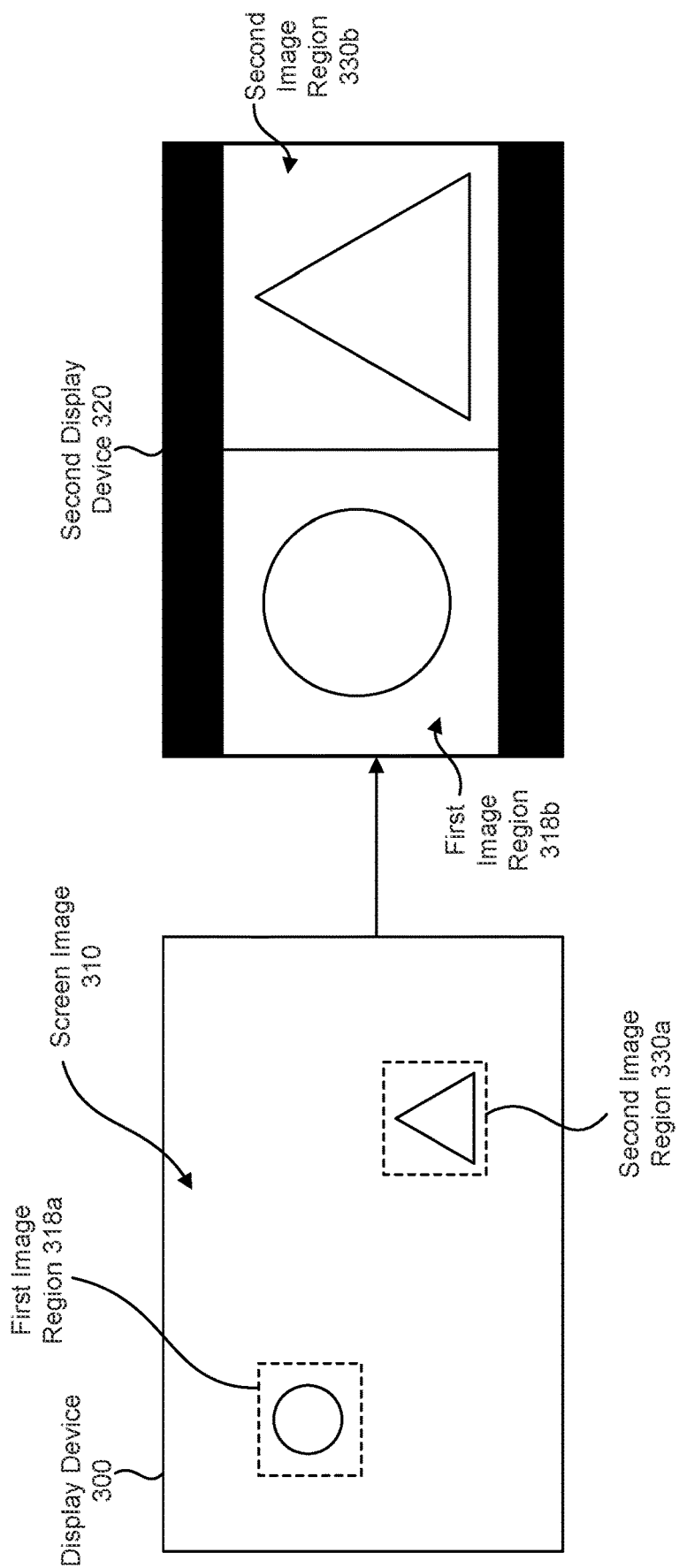
FIG. 3 illustrates the display of two image regions, according to an example.

FIG. 3 illustrates the display of two image regions, according to an example. In some examples, the display device 300 and the second display device 320 are implemented according to the display device 100 and second display device 120 of FIG. 1, respectively. For example, the display device 300 may be implemented as a standalone external monitor that receives a data stream from the source device. The display device 300 may be connected to the second display device 320 via a daisy-chain connection.

In the example of FIG. 3, the display device 300 receives a screen image 310 from a source device (e.g., FIG. 1, 112) and displays the screen image 310. A user selects a first image region 318*a* using a user interface on the display device 300. This may be accomplished as described in FIG. 2. In this example, the user also selects a second image region 330*a* for display on the second display device 320.

Upon receiving the image region selections, the display device 300 generates composite image data of the two image regions 318*a*, 330*a*. The composite image data may combine multiple images into a single image that is sent to the second display device 320. For example, the display device 300 tiles the first image region 318*a* above the second image region 330*a*. In some examples, the position of the image region tiles may be automatically determined by the display device 300 or may be defined by the user. The display device 300 sends the composite image data to the second display device 320.

Upon receiving the composite image data, the second display device 320 may display the composite image data that includes the first image region 318*b* and the second image region 330*b*. In some examples, the second display device 320 scales the composite image data as described in FIG. 2.

Figure 4:
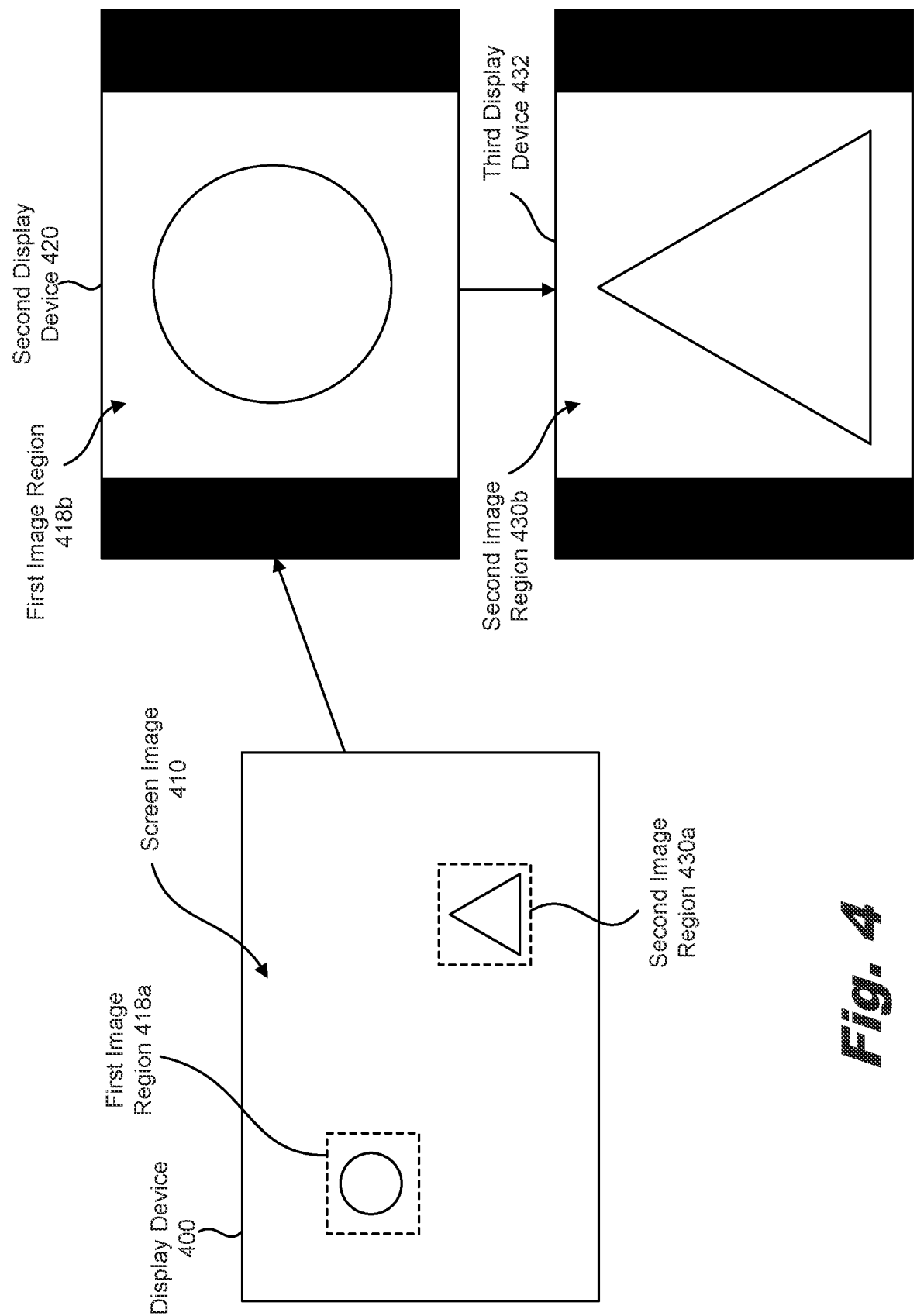
FIG. 4 illustrates the display of two image regions on separate display devices, according to an example.

FIG. 4 illustrates the display of two image regions on separate display devices, according to an example. In some examples, the display device 400 and the second display device 420 are implemented according to the display device 100 and second display device 120 of FIG. 1, respectively. For example, the display device 400 may be implemented as a standalone external monitor that receives a data stream from the source device. The second display device 420 may be connected to the display device 400 via a first daisy-chain connection. A third display device 432 may be connected to the second display device 420 via a second daisy-chain connection.

In the example of FIG. 4, the display device 400 receives a screen image 410 from a source device (e.g., FIG. 1, 112) and displays the screen image 410. A user selects a first image region 418*a* and a second image region 430*a* using a user interface on the display device 400. This may be accomplished as described in FIG. 2.

In this example, the first display device 400 sends the first image region 418*a* to the second display device 420. The second display device 420 then magnifies the first image region 418*a* and displays the magnified first image region 418*b*. This may be accomplished as described in FIG. 2.

The first display device 400 sends the second image region 430*a* to the third display device 432 via the second display device 420. The third display device 432 then magnifies the second image region 430*a* and displays the magnified second image region 430*b*. This may be accomplished as described in FIG. 2.

In some examples, a user selects which display device to view the image regions 418*a*, 430*a*. For example, the user may use a user interface (e.g., OSD controls) to indicate that the first image region 418*a* is to be displayed on the second display device 420 and the second image region 430*a* is to be displayed on the third display device 432.

Figure 5:
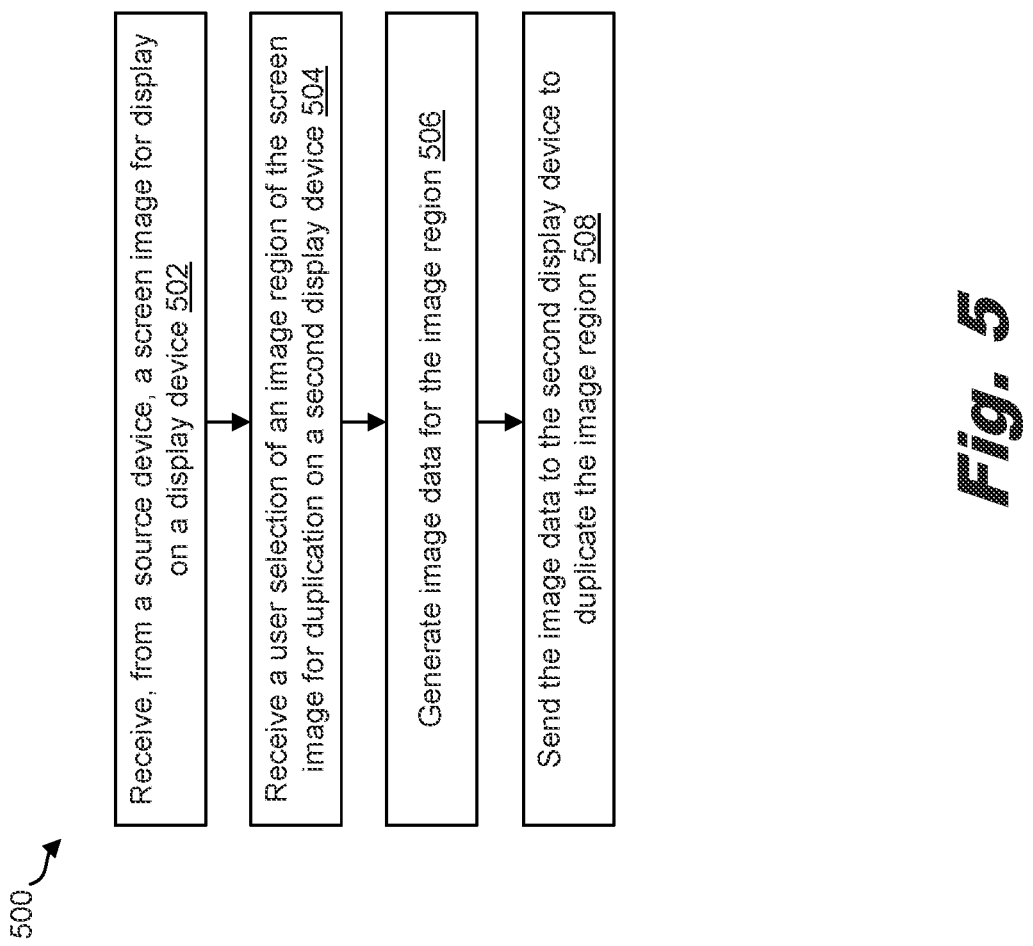
FIG. 5 is a flow diagram illustrating a method for displaying an image region, according to an example.

FIG. 5 is a flow diagram illustrating a method 500 for displaying an image region, according to an example. In some examples, the method 500 may be performed by a display device (e.g., FIG. 1, 100).

At 502, the display device receives, from a source device (e.g., FIG. 1, 112), a screen image for display on the display device. In response to receiving the screen image, the display device displays the screen image.

At 504, the display device receives a user selection of an image region of the screen image for duplication on a second display device. For example, a user may select a subset of the screen image for display on the second display device.

At 506, the display device generates image data for the image region. For example, the display device may obtain pixels corresponding to the selected image region from the screen image stored in a frame buffer of the display device.

At 508, the display device sends the image data to the second display device to duplicate the image region. In response to receiving the image data, the second display device may magnify the image data to a defined resolution. The second display device may then display the magnified image region.

Figure 6:
FIG. 6 depicts a non-transitory machine-readable storage medium for displaying selected image regions, according to an example.

FIG. 6 depicts a non-transitory machine-readable storage medium 650 for displaying selected image regions, according to an example. To achieve its desired functionality, an electronic device (e.g., display device 100) includes various hardware components. Specifically, an electronic device includes a processor and a machine-readable storage medium 650. The machine-readable storage medium 650 is communicatively coupled to the processor. The machine-readable storage medium 650 includes a number of instructions 652, 654, 656 for performing a designated function. The machine-readable storage medium 650 causes the processor to execute the designated function of the instructions 652, 654, 656. The machine-readable storage medium 650 can store data, programs, instructions, or any other machine-readable data that can be utilized to operate the electronic device. Machine-readable storage medium 650 can store computer readable instructions that the processor of the display device 100 can process or execute. The machine-readable storage medium 650 can be an electronic, magnetic, optical, or other physical storage device that contains or stores executable instructions. Machine-readable storage medium 650 may be, for example, Random Access Memory (RAM), an Electrically Erasable Programmable Read-Only Memory (EEPROM), a storage device, an optical disc, etc. The machine-readable storage medium 650 may be a non-transitory machine-readable storage medium 650, where the term "non-transitory" does not encompass transitory propagating signals.

Referring to FIG. 6, receive screen image instructions 652, when executed by the processor, may cause the processor to receive, from a source device, a screen image of a program executed by the source device, the program comprising a defined image region within the screen image. In some examples, the defined image region includes a user-selectable image region within the program executed by the source device. Receive image region selection instructions 654, when executed by the processor, may cause the processor to receive a user selection of the defined image region for duplication on a second display device. Send image region instructions 656, when executed by the processor, may cause the processor to send the defined image region to the second display device for magnification on the second display device.

In some examples, upon selection of the defined image region, the processor of the display device is to send an image data stream of the defined image region to the second display device. Upon receiving the image data stream, the second display device is to display a magnified view of the defined image region.

The above specification, examples, and data provide a description of the devices, processes and methods of the disclosure. Because many examples can be made without departing from the spirit and scope of the disclosure, this specification sets forth some of the many possible example approaches and implementations.

What is claimed is:
1. A display device, comprising:
a processor; and
a memory communicatively coupled to the processor and storing executable instructions that when executed cause the processor to:
receive, from a graphics processor of a source device, a screen image for display on the display device;
receive, from a user interface, a selection that defines an image region of the screen image;
send, for duplication on a second display device, the image region to the second display device;
define a second image region of the screen image for the duplication; and
send the second image region to a third display device via the second display device.

2. The display device of claim 1,
wherein the display device is connected to the second display device with a daisy chain between the display device and the second display device, and
wherein the display device is to send the image region to the second display device over the daisy chain.

3. The display device of claim 1, wherein the image region is a subset of the screen image displayed on the display device.

4. The display device of claim 1, wherein the image region comprises a grid of pixels of the screen image displayed on the display device.

5. The display device of claim 1, wherein the user interface comprises:
a cursor control device to allow a user to select the image region; and
a selection device to confirm the selection of the image region.

6. The display device of claim 1, wherein the display device comprises an external monitor that is to be connected to the source device.

7. The display device of claim 1, wherein the executable instructions when executed cause the processor to:
generate a composite image based on the image region and the second image region,
wherein to send the image region, the executable instructions when executed causes the processor to:
send the composite image to the second display device.

8. The display device of claim 1, wherein the display device is connectable between the source device and the second display device.

9. The display device of claim 1, wherein on the display device, an area of the image region is smaller than an area of the screen image.

10. A method by a display device, the method comprising:
receiving, from a source device, a screen image having an image region that is a subset of the screen image;
selecting, by a user interface, the image region while displaying the screen image on the display device;
generating, in response to selecting the image region, image data for the image region;
receiving user selections for a plurality of image regions;
generating composite image data for the plurality of image regions;

sending, to duplicate the image region on a second display device, the image data to the second display device; and sending the composite image data to the second display device.

11. The method of claim 10, further comprising:

receiving a static image selection for the image region; and generating static image data for the image region for display on the second display device in response to receiving the static image selection; and sending the static image data to the second display device.

12. The method of claim 10, further comprising:

receiving a dynamic image selection for the image region; and generating dynamic image data for the image region for display on the second display device in response to receiving the dynamic image selection; and sending the dynamic image data to the second display device.

13. The method of claim 12, wherein the dynamic image data comprises a video stream of the image region.

14. The method of claim 10, wherein the display device is connected between the source device and the second display device.

15. A non-transitory machine-readable storage medium comprising instructions, when executed by a processor of a display device, cause the processor to:

receive, from a source device, a screen image having a defined image region as a subset of the screen image;

receive, from a user interface, a selection of the defined image region for duplication on a second display device, a size of the defined image region being smaller than a size of the screen image displayed on the display device; and send the defined image region to the second display device for magnification on the second display device, wherein the display device is connectable between the source device and the second display device.

16. The non-transitory machine-readable storage medium of claim 13, wherein the defined image region comprises a user-selectable image region within a program executed by the source device.

17. The non-transitory machine-readable storage medium of claim 15, wherein upon the selection of the defined image region, the processor of the display device is to:

send an image data stream of the defined image region to the second display device, wherein upon receiving the image data stream the second display device is to display a magnified view of the defined image region.

* * * * *